United States Patent
Nagaoka

(10) Patent No.: US 6,734,915 B2
(45) Date of Patent: May 11, 2004

(54) CRADLE-INSTALLATION TYPE DIGITAL CAMERA, CONTROL METHOD THEREFOR AND CRADLE-INSTALLATION TYPE DIGITAL CAMERA SYSTEM

(75) Inventor: Shiro Nagaoka, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 10/096,105

(22) Filed: Mar. 13, 2002

(65) Prior Publication Data
US 2003/0117521 A1 Jun. 26, 2003

(30) Foreign Application Priority Data
Dec. 26, 2001 (JP) .......................................... 2001-395283

(51) Int. Cl.[7] .................. H04N 5/225; H04N 5/222; H04M 1/00
(52) U.S. Cl. ................. 348/375; 348/333.06; 348/373; 455/556.2
(58) Field of Search .................... 348/207.1, 207.11, 348/211.8, 211.13, 211.14, 552, 333.01, 333.06, 333.11, 333.13, 375, 376, 373, 372; 358/906; 396/300, 301; 455/556.1, 567, 556.2

(56) References Cited

U.S. PATENT DOCUMENTS

| | | | | |
|---|---|---|---|---|
| 5,959,671 A | * | 9/1999 | Etoh et al. ................... | 348/373 |
| 6,108,568 A | * | 8/2000 | Lebrun et al. ............... | 455/573 |
| 2002/0079864 A1 | * | 6/2002 | Soumi et al. ................ | 320/115 |
| 2002/0101534 A1 | * | 8/2002 | Liu .............................. | 348/375 |
| 2002/0132639 A1 | * | 9/2002 | Sato ............................ | 455/556 |
| 2002/0149695 A1 | * | 10/2002 | Kayanuma ................... | 348/375 |
| 2002/0186319 A1 | * | 12/2002 | Whitby et al. ............... | 348/375 |
| 2003/0076440 A1 | * | 4/2003 | Terane ......................... | 348/373 |
| 2003/0090572 A1 | * | 5/2003 | Belz et al. .............. | 348/207.11 |
| 2003/0117499 A1 | * | 6/2003 | Bianchi et al. ............. | 348/373 |

FOREIGN PATENT DOCUMENTS

| | | | | |
|---|---|---|---|---|
| JP | 2001-142837 | | 5/2000 | |
| JP | 2000-232599 | | 8/2000 | |
| JP | 2003-87620 | | 3/2003 | |
| JP | 2003-87621 | | 3/2003 | |
| JP | 2003087620 A | * | 3/2003 | .......... H04N/5/225 |
| JP | 2003087621 A | * | 3/2003 | .......... H04N/5/225 |

* cited by examiner

*Primary Examiner*—Wendy R. Garber
*Assistant Examiner*—John M Villecco
(74) *Attorney, Agent, or Firm*—Pillsbury Winthrop LLP

(57) ABSTRACT

A digital camera can be selectively installed in a cradle in whichever states where an imaging lens is arranged toward the outside in the cradle or where a liquid crystal display portion is arranged toward the outside in the cradle, and a device connected to the cradle and the digital camera is allowed to perform a linkage operation.

16 Claims, 12 Drawing Sheets

| Connection device | Installation direction of digital camera | |
|---|---|---|
| | Direct imagin lens toward user | Direct liquid crystal display portion toward user |
| PC | PC camera | Card reader writer |
| Television receiver | TV camera | Projector |
| None | Monitor camera | Electronic photo stand |
| Others | Charging | Charging |

CRADLE-INSTALLATION TYPE DIGITAL CAMERA, CONTROL METHOD THEREFOR AND CRADLE-INSTALLATION TYPE DIGITAL CAMERA SYSTEM

CROSS-REFERENCE TO RELATED APPLICATIONS

This application is based upon and claims the benefit of priority from the prior Japanese Patent Application No. 2001-395283, filed Dec. 26, 2001, the entire contents of which are incorporated herein by reference.

BACKGROUND OF THE INVENTION

1. Field of the Invention

The present invention relates to a cradle-installation type digital camera, which allows a digital camera to be installed in a cradle, a control method therefor and improvement of a cradle-installation type digital camera system.

2. Description of the Related Art

As is generally known, in the field of digital cameras in recent years, an attempt to develop a high density of pixels has completed the first stage of development, and as a next object, there is a demand for seeking advantages and superiority which have not been found in cameras using a silver halide film or not available without digital data processing.

In response to such a demand, there has been proposed a technology in which a digital camera is presently formed in such a manner as to be installed in a cradle and charging is performed on the digital camera via this cradle, and the digital camera is connected to a personal computer, a television receiver and the like so as to realize multiple functions.

For example, Jpn. Pat. Appln. KOKAI Publication No. 2000-232599 discloses a technology in which the digital camera is connected to a network via the cradle, and Jpn. Appln. KOKAI Publication No. 2001-142837 discloses a technology in which an electrical connection between the digital camera and the cradle is replaced by a non-contact infrared connection.

However, the technology to attempt to make the digital camera multi-functional by installing it in a cradle in such manner is still at a developing stage, and the present situation is such that it is too early to say that the technology has reached a practical level where users' needs can be fully satisfied.

BRIEF SUMMARY OF THE INVENTION

The present invention has been carried out in view of the above situation and aims to provide a cradle-installation type digital camera and control method thereof and a cradle-installation type digital camera system.

According to one aspect of the present invention, there is provided a cradle-installation type digital camera comprising a camera body, an imaging lens on the camera body and a display portion on the camera body wherein the camera body is constituted to be selectively installable in whichever states where the imaging lens is arranged toward the outside in a cradle or where the display portion is arranged toward the outside in the cradle.

According to one aspect of the present invention, there is provided a control method for a cradle-installation type digital camera to control the digital camera installed in a cradle, comprising:

detecting whether the digital camera was installed in the cradle with the imaging lens arranged toward the outside, or the digital camera was installed in the cradle with the display portion arranged toward the outside; and controlling so as to allow the digital camera to perform an imaging operation in a state where it is detected that the digital camera was installed in the cradle with the imaging lens arranged toward the outside.

According to one aspect of the present invention, there is provided a control method for a cradle-installation type digital camera to control the digital camera installed in a cradle, comprising:

detecting whether the digital camera was installed in the cradle with an imaging lens arranged toward the outside, or the digital camera was installed in the cradle with a display portion arranged toward the outside; and controlling so as to allow the display portion to perform an image display operation in a state where it is detected that the digital camera was installed in the cradle with the display portion arranged toward the outside.

According to one aspect of the present invention, there is provided a cradle-installation type digital camera system comprising:

a cradle;

a digital camera constituted to be selectively installable in whichever states where an imaging lens is arranged toward the outside in the cradle or a display portion is arranged toward the outside in the cradle; and a device capable of performing an operation linked to the digital camera which is connected to the cradle and installed in the cradle.

According to the above described constitution, method and system, it is possible to realize various functions including control equipment and image display equipment connected to the cradle and attempt multi-functionality at a practical level.

DETAILED DESCRIPTION OF THE INVENTION

Figure 1:
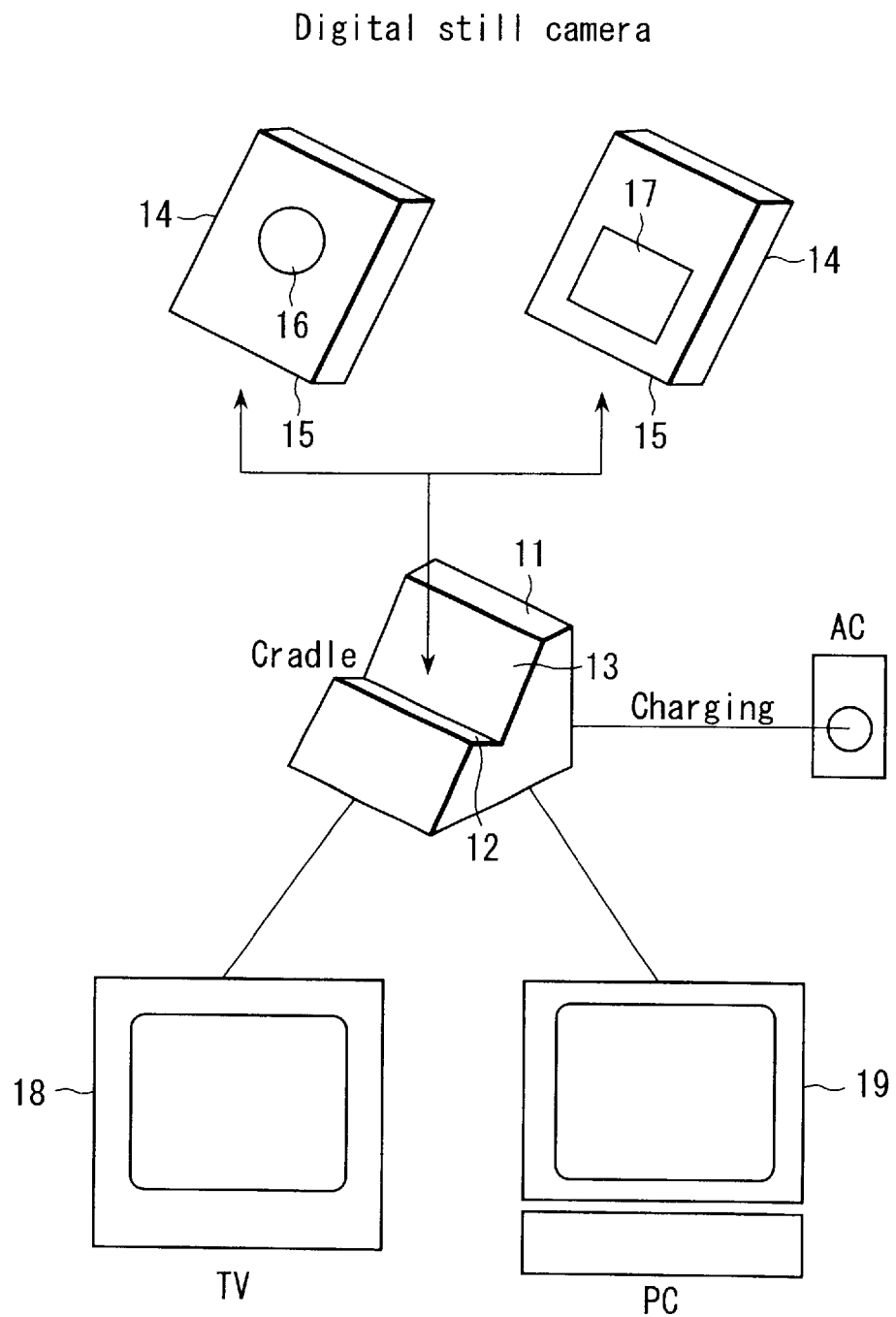
FIG. 1 shows one embodiment of the present invention and is a view to explain an outline of a cradle-installation type digital camera system.

Hereinafter, one embodiment of the present invention will be described with reference to the drawings. FIG. 1 shows an outline of a cradle-installation type digital camera system to be described in this embodiment. That is, reference numeral 11 denotes a cradle, and a stepwise mounting surface 12 and an inclined surface 13 are formed on its one side surface.

Reference numeral 14 denotes a digital camera, which is formed in a nearly rectangular parallelepiped shape. This digital camera 14 has its bottom surface 15 placed on a mounting surface 12 of the cradle 11, and moreover, leaned over an inclined surface 13 of the cradle 11 so that it can be mounted on the cradle 11.

In this case, the digital camera 14 can take either of the form of being installed in the cradle 11 with the surface where an imaging lens 16 thereof is arranged directed toward the user side, that is, the outside, or the form of being installed in the cradle 11 with the surface where a liquid crystal display portion 17 thereof is arranged toward the user side.

This cradle 11 is connected to a television receiver 18, a PC (Personal Computer) 19 and the like, and can perform an operation linked to the digital camera 14. Further, this cradle 11 receives a power supply from a commercial AC source and can perform the charging of the digital camera 14.

Figure 2A:
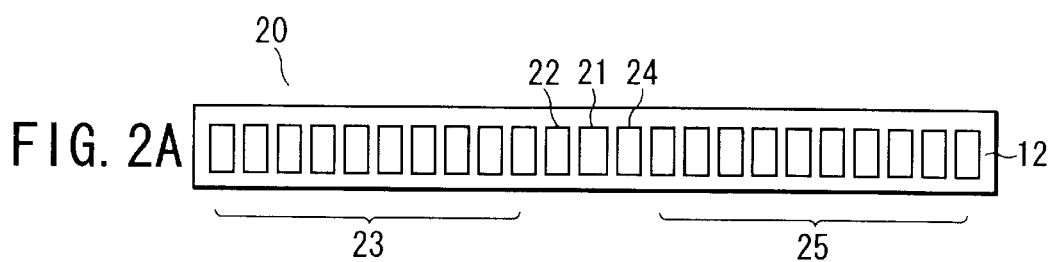
FIGS. 2A to 2C are views showing the details of a connector of a cradle and a connector of a digital camera in the same embodiment, respectively.

Here, as shown in FIG. 2A, a connector 20 to attempt an electrical connection with the digital camera 14 is formed in the above described mounting surface 12 of the cradle 11. This connector 20 is constituted in such a manner as to line up a plurality of terminals in one row, and a direct-current power supply terminal 21, which is a positive electrode, is arranged in its center.

A ground terminal 22 is arranged on the one side of the direct-current power supply terminal 21, and moreover, a plurality of imaging system terminals 23 are arranged on its outside. Further, a ground terminal 24 is arranged on the other side of the direct-current source terminal 21, and a plurality of display system terminals 25 are arranged on its outside.

Figure 2B:
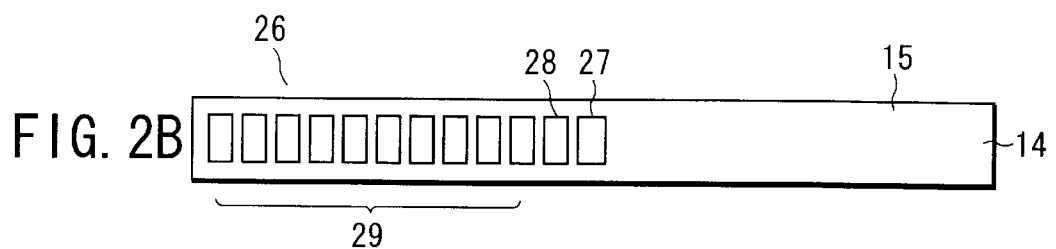

On the other hand, as shown in FIG. 2B, a connector 26 to attempt an electrical connection with the connector 20 of the cradle 11 is formed on the bottom surface 15 of the above described digital camera 14. This connector 26 has a direct-current power supply terminal 27, a ground terminal 28 and a plurality of control system terminals 29.

Figures 3A, 3B:
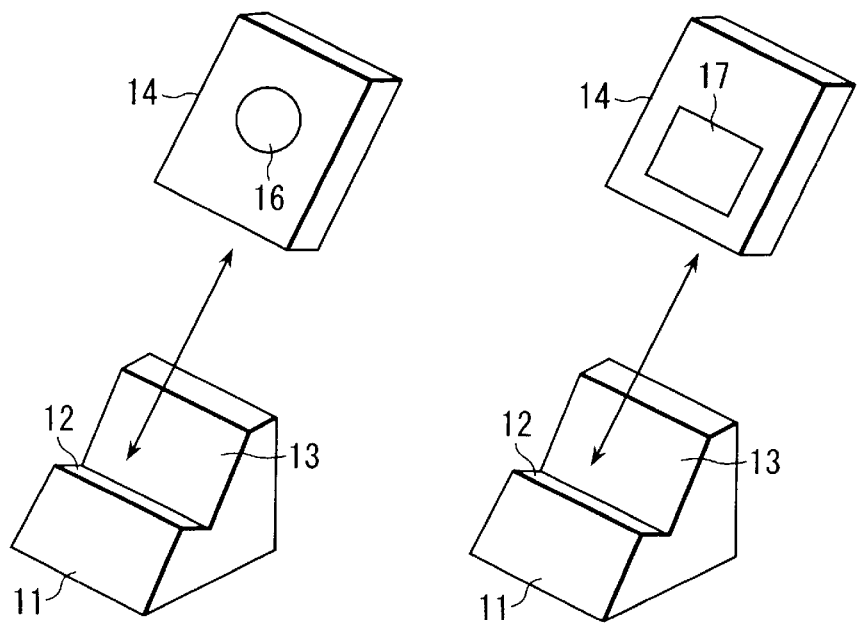
FIGS. 3A to 3B are views to explain a direction in which the digital camera is installed in the cradle in the same embodiment, respectively.

As shown in FIG. 3A, when the digital camera 14 is in a state of being installed in the cradle 11 with its imaging lens 16 directed toward the user side, the direct-current power supply terminal 27 of the connector 26, the ground terminal 28 and the plurality of control system terminals 29 are correspondingly connected to the direct-current supply power supply terminal 21 of the connector 20, the ground terminal 22 and the plurality of imaging system terminals 23, respectively.

Figure 2C:
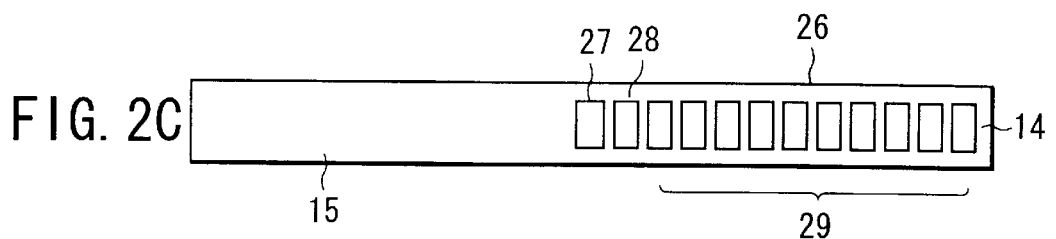

As shown in FIG. 3B, when the digital camera 14 is in a state where the camera is installed in the cradle 11 with its liquid crystal display portion 17 arranged toward the user side, the direction of the digital camera 14 changes as shown in FIG. 2C. For this reason, the direct-current power supply terminal 27 of the connector 26, the ground terminal 28 and the plurality of control system terminals 29 are correspondingly connected to the direct-current power supply terminal 21 of the connector 20, the earth terminal 24 and the plurality of display system terminals 25, respectively.

In this case, the connectors 20 and 26 are provided with one each of the direct-current power supply terminals 21 and 27, respectively so that, even when the digital camera 14 is in a state where the camera is installed with whichever of the imaging lens 16 or the liquid crystal display portion 17 arranged toward the user side, both of the direct-current power supply terminals 21 and 27 are connected in common.

Figure 4:
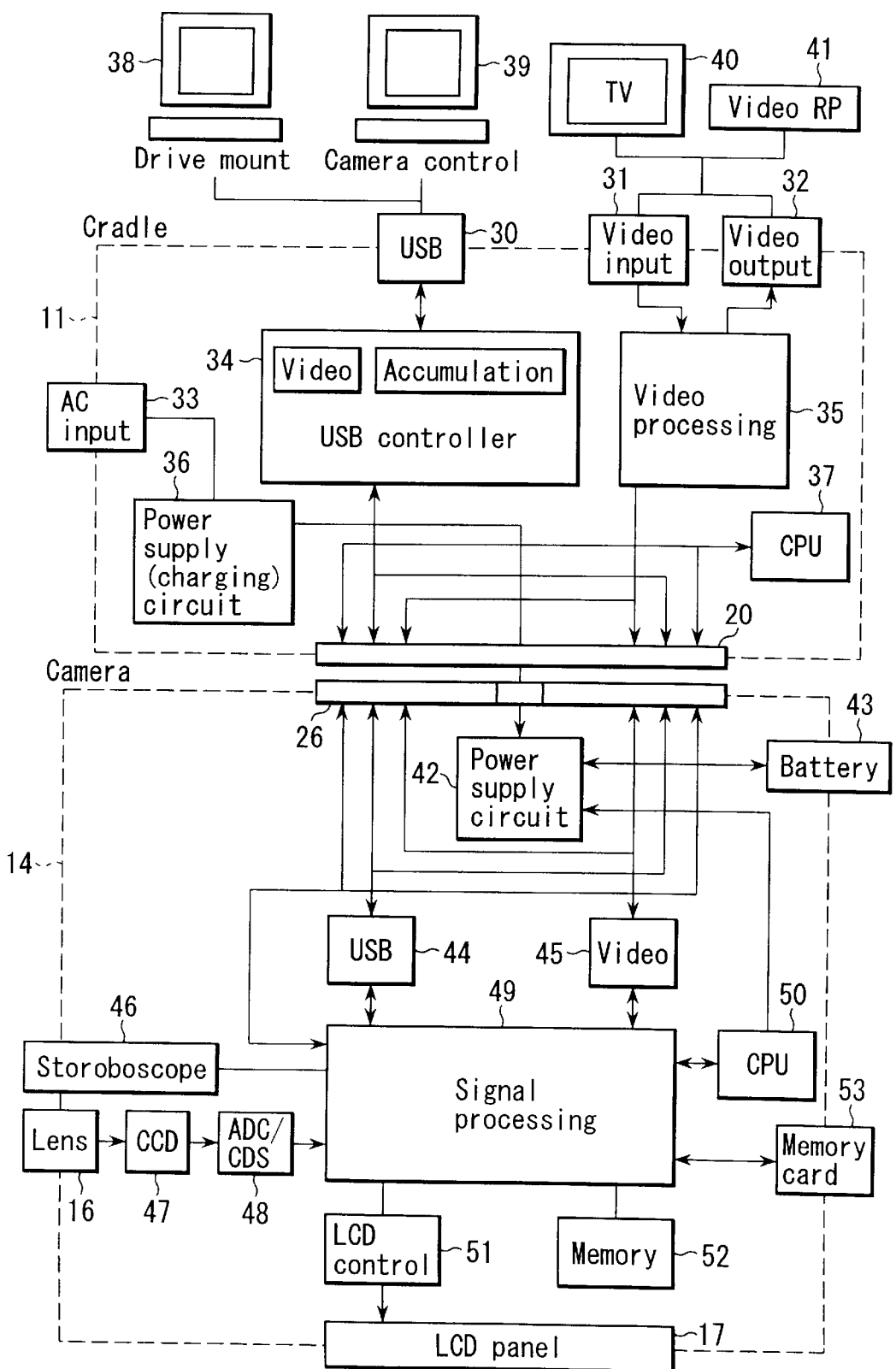
FIG. 4 is a block diagram for explaining the details of the cradle and the digital camera in the same embodiment.

FIG. 4 shows the details of the above described cradle 11 and the digital camera 14. First, the cradle 11 is mainly constituted by a USB (Universal Serial Bus) interface portion 30, a video input portion 31, a video output portion 32, an AC input portion 33, a USB controller 34, a video processing portion 35, a power supply (charging) circuit 36, a CPU (Central Processing Unit) 37 and the connector 20.

The above described USB interface portion 30 is connected to various types of PCs 38, 39 and the like which are equivalent to the above described PC 19. The video input portion 31 and the video output portion 32 are connected to a television receiver 40, a video recording playback system 41 and the like which are equivalent to the above described television receiver 18.

The above described digital camera 14 is mainly constituted by the connector 26, a power supply circuit 42, a battery 43, a USB interface portion 44, a video interface portion 45, a stroboscope 46, the above described imaging lens 16, a CCD (Charge Coupled Device) 47, an ADC (Analog-to-Digital Converter) 48, a signal processing portion 49, a CPU 50, a LCD (Liquid Crystal Display) control portion 51, a memory 52 and the above described liquid crystal display portion 17. Note that this digital camera 14 is detachably attached to a memory card 53.

When the digital camera 14 is installed in the cradle 11, regardless of the direction of the digital camera 14, that is, whether or not the imaging lens 16 is arranged toward the user side or the liquid crystal display portion 17 is arranged toward the user side, the direct-current power supply terminal 21 of the connector 20 and the direct-current supply terminal 27 of the connector 26 are connected.

Figure 5:
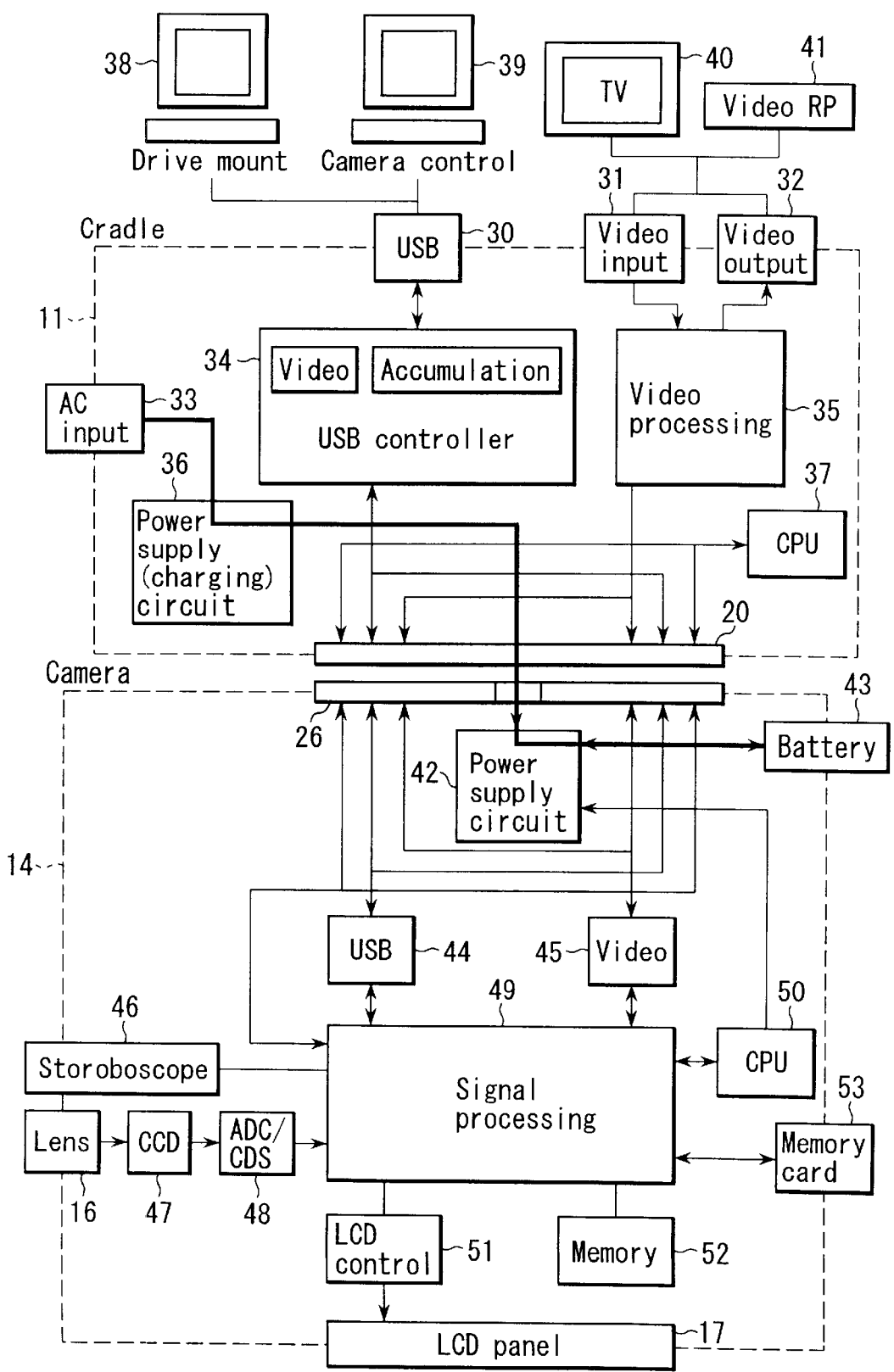
FIG. 5 is a block diagram for explaining a signal path to realize a charging function for the digital camera in the same embodiment.

For this reason, similar to the path shown by a thick line in FIG. 5, power is supplied from the AC input portion 33 of the cradle 11 to the battery 43 via the power supply (charging) circuit 36, the direct-current power supply terminal 21 of the connector 20, the direct-current power supply source terminal 27 of the connector 26 of the digital camera 14 and the power supply circuit 42, thereby achieving the charging function to the battery 43.

When the digital camera 14 is installed, the cradle 11 automatically detects its direction. First, when the digital camera 14 is installed with its imaging lens 16 arranged toward the user side, similar to a path "a" shown by a thick line in FIG. 6, the CPU 37 of the cradle 11 is connected to the signal processing portion 49 via the imaging system terminals 23 of the connector 20 and the control system terminals 29 of the connector 26 of the digital camera 14.

In this case, the CPU 37 of the cradle 11 determines that the digital camera 14 was installed in the cradle 11 with the imaging lens 16 arranged toward the user side from the fact that it was able to perform communications with the signal processing portion 49 of the digital camera 14 via the imaging system terminals 23 of the connector 20.

Figure 6:
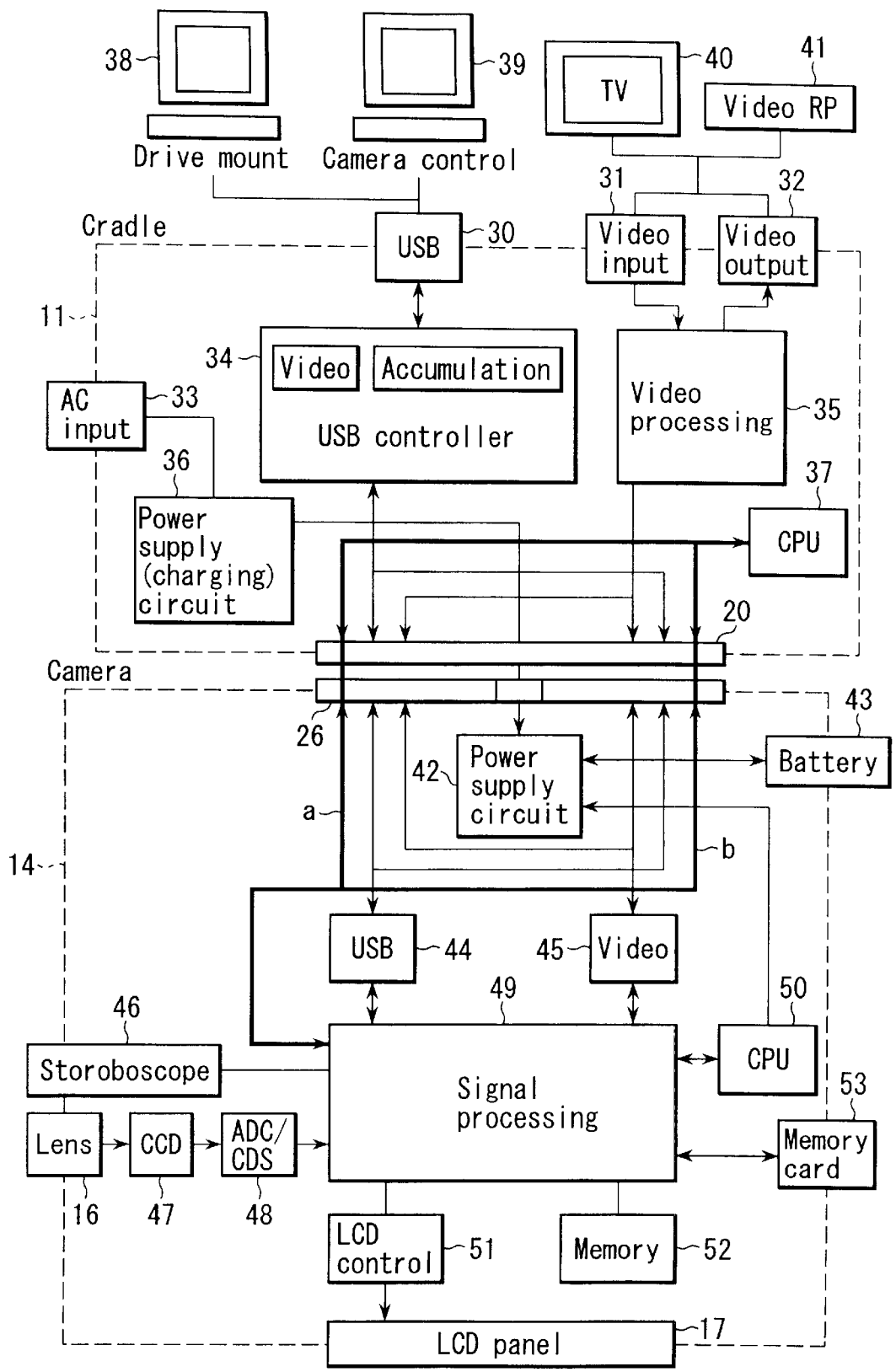
FIG. 6 is a block diagram for explaining the signal path in which the cradle in the same embodiment realizes an automatic discrimination function of the direction in which the digital camera is installed.

On the other hand, when the digital camera 14 is installed in the cradle 11 with the liquid crystal display portion 17 arranged toward the user side, similar to a path "b" shown by a thick line in FIG. 6, the CPU 37 of the cradle 11 is connected to the signal processing portion 49 via the display system terminals 25 of the connector 20 and the control system terminals 29 of the connector 26 of the digital camera 14.

In this case, the CPU 37 of the cradle 11 determines that the digital camera 14 was installed in the cradle 11 with the liquid crystal display portion 17 arranged toward the user side from the fact that it was able to perform communications with the signal processing portion 49 of the digital camera 14 via the display system terminals 25 of the connector 20.

Figures 7, 8:
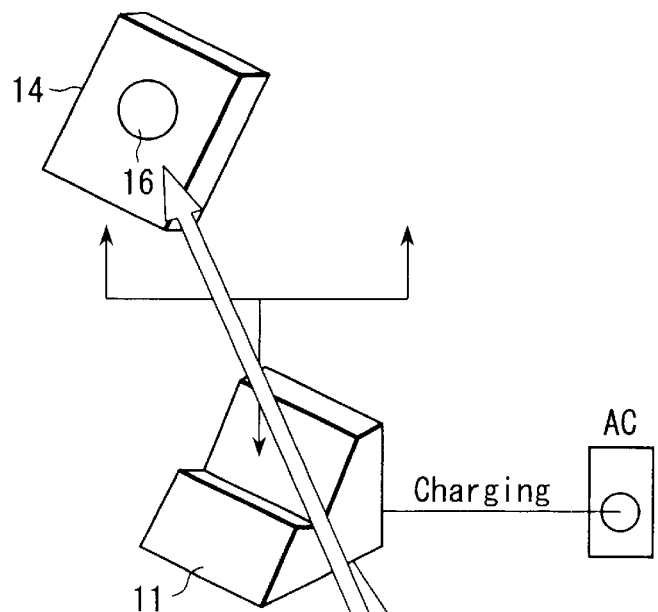
FIG. 7 is a view for explaining a list of functions realizable according to the direction when the digital camera is installed in the cradle in the same embodiment.
FIG. 8 is a view for explaining a connection state with the digital camera, the cradle and a PC to realize the PC camera function in the same embodiment.

FIG. 7 shows a list of functions realizable according to the direction in which the digital camera 14 is installed in the cradle 11. First, when the digital camera 14 is installed in the cradle 11 so as to arrange the imaging lens 16 toward the user side, a PC camera function can be realized by using the digital camera 14 and the PC 39 connected to the cradle 11.

This PC camera function is, as shown in FIG. 8, a function to install the digital camera 14 in the cradle 11 so as to arrange the imaging lens 16 toward the user side and control the digital camera 14 by using the PC 39 connected to the cradle 11.

Figure 9:
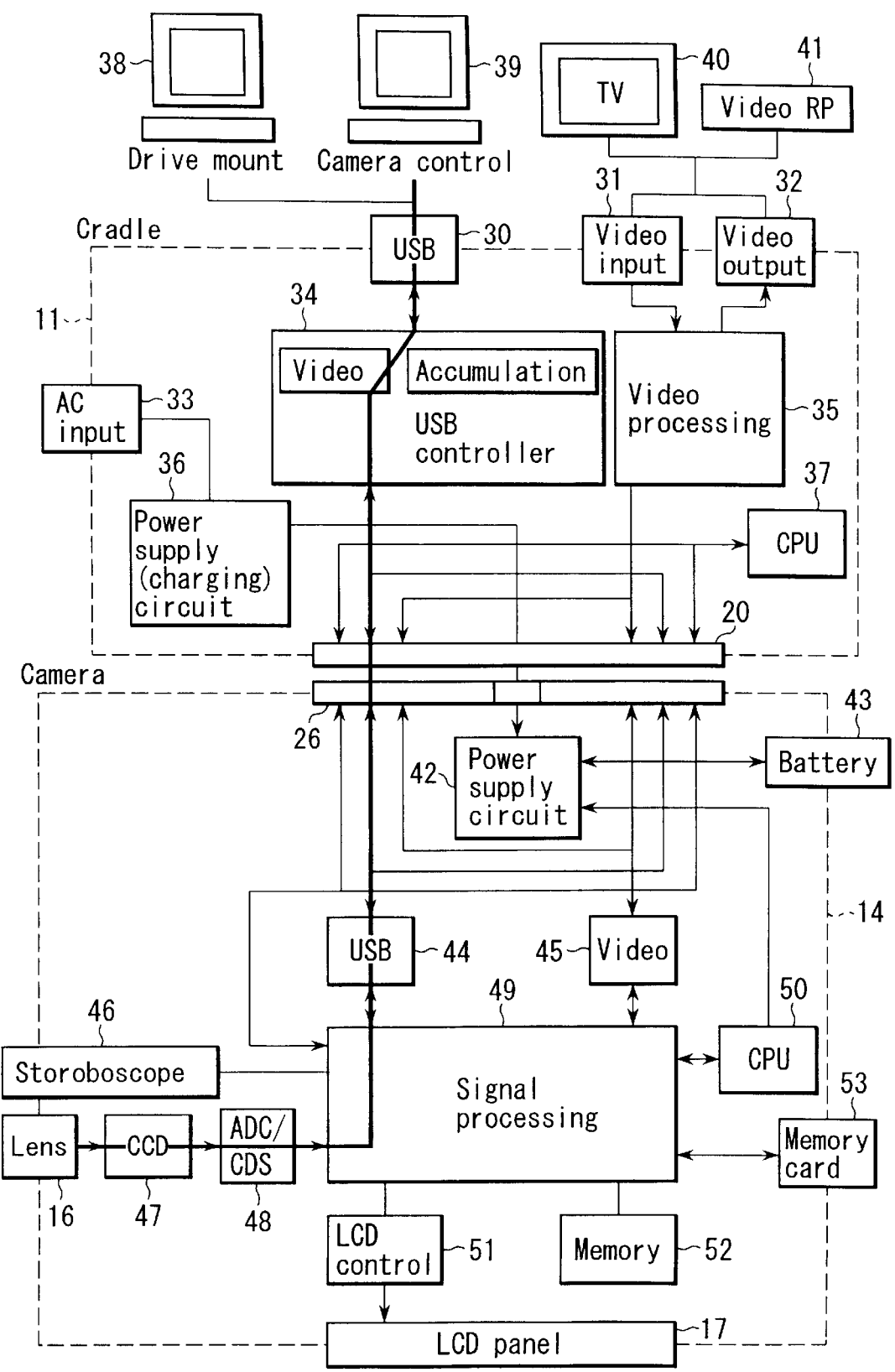
FIG. 9 is a block diagram for explaining the signal path to realize the PC camera function in the same embodiment.

That is, as shown by a path of a thick line in FIG. 9, the PC 39 controls the digital camera 14 by controlling the signal processing portion 49 via USB interface portion 30 and USB controller 34 of the cradle 11, the imaging system terminals 23 of the connector 20, the control system terminals 29 and the USB interface portion 44 of the connector 26 of the digital cameral 14.

An optical image of a subject incident via the imaging lens 16 is converted into an electrical signal by the CCD 47, and after that, it is taken by the PC 39 via the ADC 48, the signal processing portion 49, the USB interface portion 44, the control system terminals 29 of the connector 26, the imaging system terminals 23 of the connector 20 of the cradle 11 and USB controller 34 and USB interface portion 30, and is displayed on a monitor of the PC 39.

Again, as shown in FIG. 7, when the digital camera 14 is installed in the cradle 11 so as to arrange the liquid crystal display portion 17 toward the user side, a card reader/writer function for the memory card 53 mounted on the digital camera 14 can be realized by using the digital camera 14 and the PC 38 connected to the cradle 11.

Figures 10, 12:
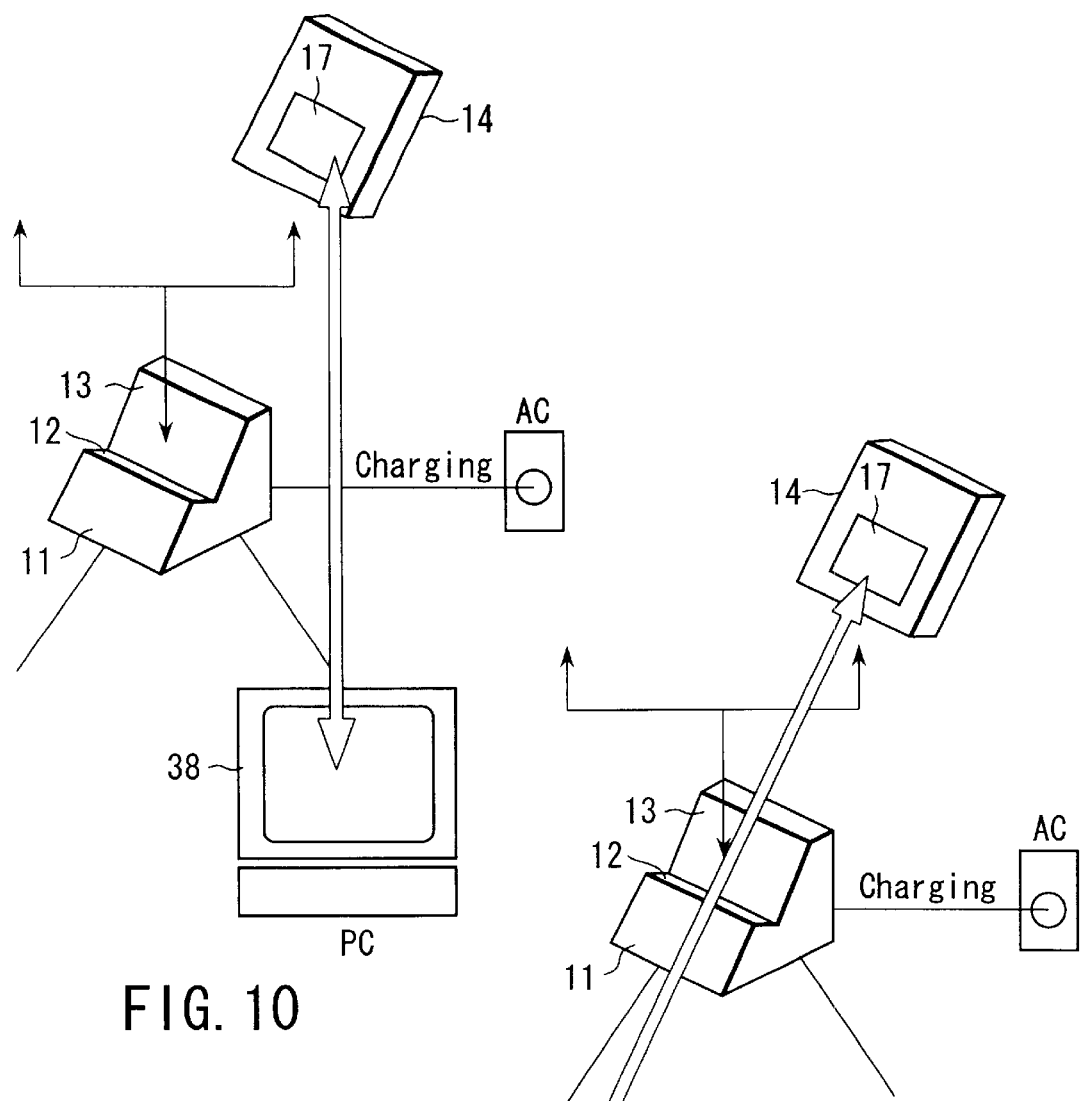
FIG. 10 is a view for explaining a connection state with the digital camera, the cradle and the PC to realize a card reader/writer function in the same embodiment.
FIG. 12 is a view for explaining a connection state with the digital camera, the cradle and a television receiver, which realizes a projection function in the same embodiment.

This card reader/writer function is, as shown in FIG. 10, a function to mount the digital camera 14 on the cradle 11 so as to arrange the liquid crystal display portion 17 toward the user side and perform recording and playback on the memory card 53 mounted on the digital camera 14 by using the PC 38 connected to the cradle 11.

Figure 11:
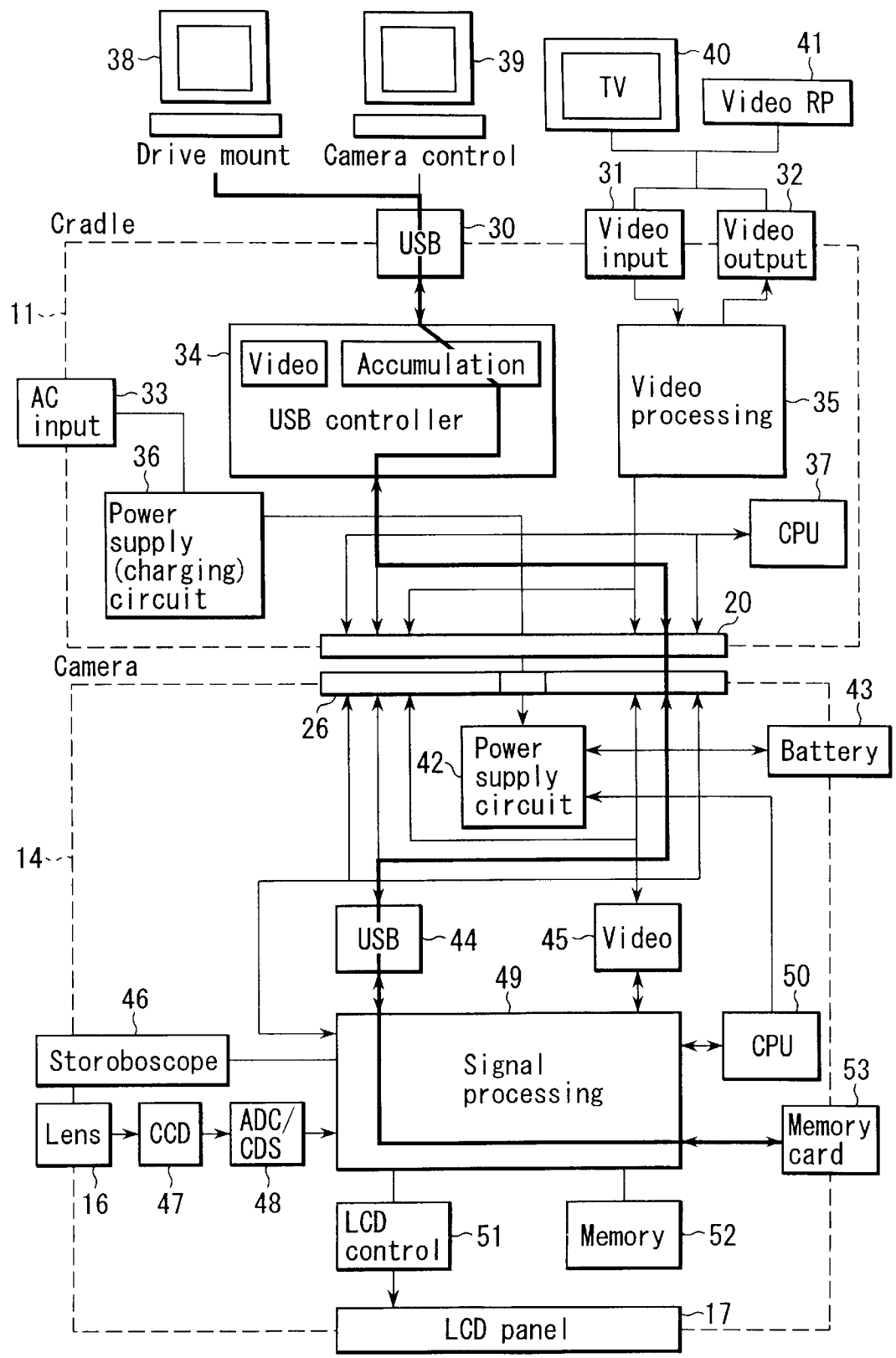
FIG. 11 is a block diagram showing the signal path, which realizes the card reader/writer function in the same embodiment.

That is, as shown by a path of a thick line in FIG. 11, the PC 38 can perform the writing of data to the memory card 53 by controlling the signal processing portion 49 via the USB interface portion 30 of the cradle 11, the USB controller 34, the display system terminals 25 of the connector 20, the control system terminals 29 of the connector 26 of the digital camera 14 and USB interface portion 44.

The PC 38 reads the data recorded in the memory card 53 via the signal processing portion 49, the USB interface portion 44, the control system terminals 29 of the connector 26, the display system terminals 25 of the connector 20 of the cradle 11 and the USB controller 34 and the USB interface portion 30, and the data can be displayed on the monitor.

As shown again in FIG. 7, when the digital camera 14 is installed in the cradle 11 so as to arrange the liquid crystal display portion 17 toward the user side, a projection function can be realized by using the digital camera 14 and the television receiver 40 connected to the cradle 11.

This projection function is, as shown in FIG. 12, a function to install the digital camera 14 in the cradle 11 so as to arrange the liquid crystal display portion 17 toward the user side and display the image information output from the television receiver 40 connected to the cradle 11 on the liquid crystal display portion 17 and to record it in the memory card 53 by the control of the digital camera 14.

Figure 13:
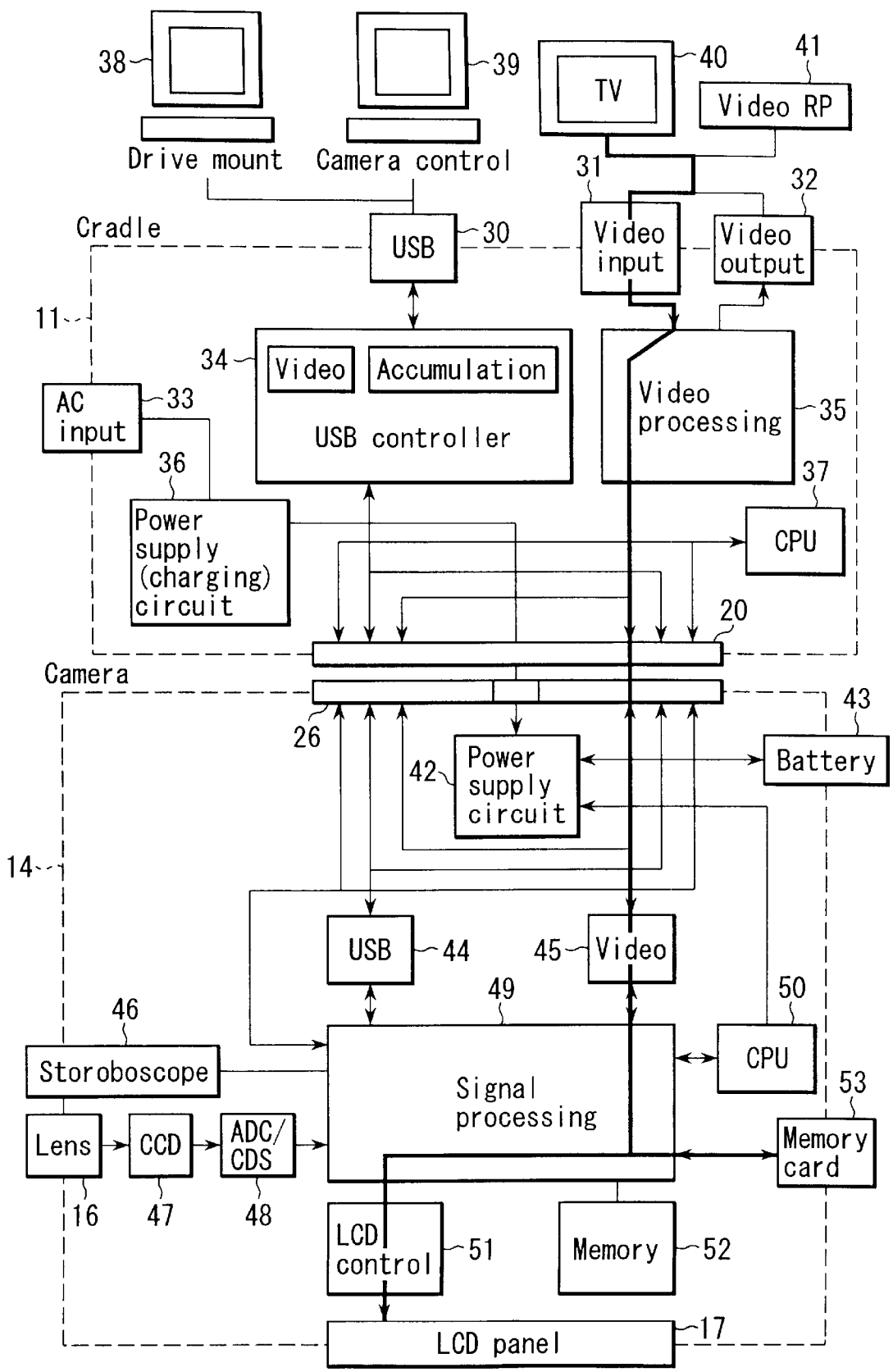
FIG. 13 is a block diagram for explaining the signal path, which realizes the projection function in the same embodiment.

That is, as shown by a path of a thick line in FIG. 13, the image information output from the television receiver 40 is displayed on the liquid crystal display portion 17 via the LCD control portion 51 after going through the video input portion 31, the video processing portion 35, the display system terminals 25 of the connector 20, the control system terminals 29 of the connector 26 of the digital camera 14, the video interface portion 45 and the signal processing portion 49, and can be recorded in the memory card 53.

Note that the image information recorded in the memory card 53 is read by the signal processing portion 49, and after that, it is supplied to the television receiver 40 via the video interface portion 45, the control system terminals 29 of the connector 26 and the display system terminals 25 of the connector 20 of the cradle 11, the video processing portion 35 and the video output portion 32, and can be also image-displayed.

As shown in FIG. 7, when the digital camera 14 is installed in the cradle 11 so as to arrange the imaging lens 16 toward the user side, a TV (television) camera function can be realized by using the digital camera 14 and the television receiver 40 connected to the cradle 11.

This TV camera function is a function to install the digital camera 14 in the cradle 11 so as to arrange the imaging lens 16 toward the user side and make it possible to monitor the optical image of the subject incident via the imaging lens 16 by the television receiver 40 by the control of the digital camera 14.

Figure 14:
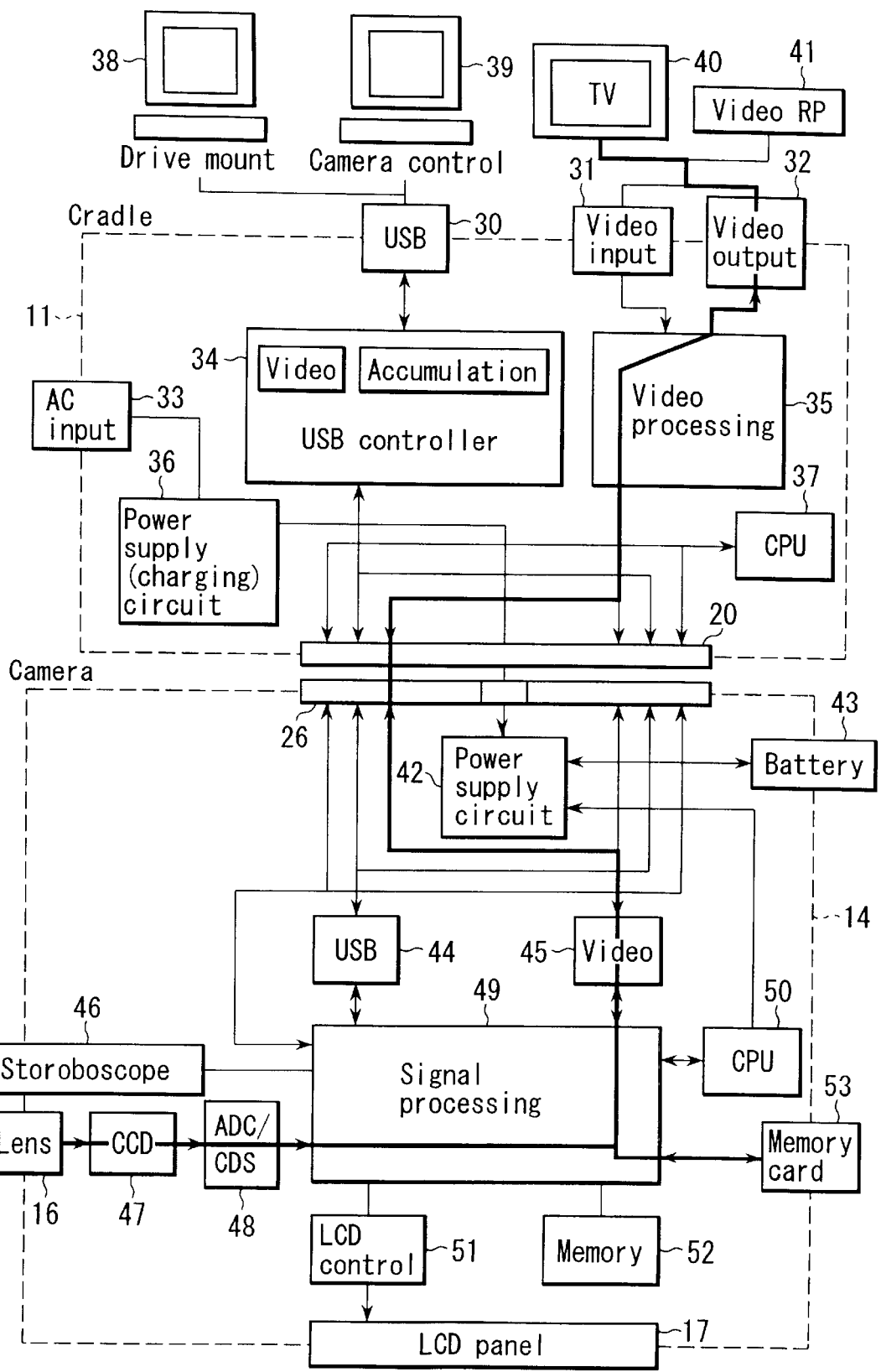
FIG. 14 is a block diagram for explaining the signal path, which realizes a TV camera function in the same embodiment.

That is, as shown in a path of a thick line in FIG. 14, the optical image of the subject incident via the imaging lens 16 of the digital camera 14 is converted into an electrical signal by the CCD 47, and after that, it is supplied to the television receiver 40 via the ADC 48, the signal processing portion 49, the video interface portion 45, the control system terminals 29 of the connector 26, the imaging system terminals 23 of the connector 20 of the cradle 11, the video processing portion 35 and the video output portion 32, and can be image-displayed.

As shown in FIG. 7, when the digital camera 14 is installed in the cradle 11 so as to arrange the imaging lens 16 toward the user side, a monitor camera function can be realized. This monitor camera function is a function to allow the digital camera 14 to automatically take pictures (including static images, dynamic picture images, speech sounds and the like) by the control of the cradle 11 at a predetermined interval.

As shown in FIG. 7, when the digital camera 14 is installed in the cradle 11 so as to arrange the liquid crystal display portion 17 toward the user side, an electronic photo stand function can be realized. This electronic photo stand function is a function to automatically switch the image information recorded in the memory card 53 by the control of the cradle 11 at a predetermined interval and image-display it on the liquid crystal display portion 17.

Note that, in FIG. 7, in addition to other functions, there is a charging function for the battery 43 of the above described digital camera 14. This charging function may be constituted in such a manner as to function only when a power switch of the cradle 11 is in an off state.

According to the above described embodiment, according to the direction of the digital camera 14 installed in the cradle 11, various functions as shown in FIG. 7 can be realized only by the cradle 11 and the digital camera 14 or including even the PCs 38 and 39 connected to the cradle 11 and the television receiver 49, and multi-functionality at a practical level can be attempted.

In the above described embodiment, though the respective terminals 21 to 25 of the connector 20 of the cradle 11 and the respective terminals 27 to 29 of the connector 26 of the digital camera 14 are brought into contact so as to be connected with one another, the connection with the cradle 11 and the digital camera 14 can use a non-contact system also.

Figure 15A:
FIGS. 15A to 15C are views for explaining an example in which information transmission between the cradle and the digital camera are performed by a non-contact system.
Figure 15B:
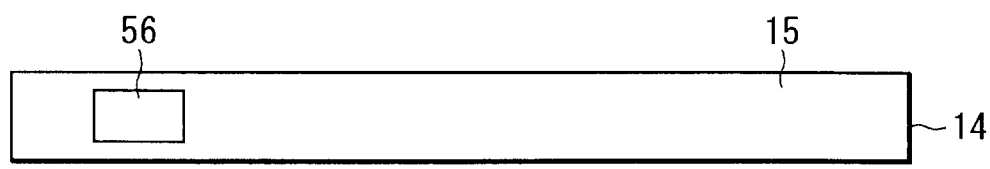

That is, as shown in FIG. 15A, an imaging system infrared emitting and receiving portion 54 and a display system infrared emitting and receiving portion 55 are installed on the mounting surface 12 of the cradle 11, and as shown in FIG. 15B, a control system infrared emitting and receiving portion 56 is installed on the bottom surface 15 of the digital camera 14.

Figure 15C:
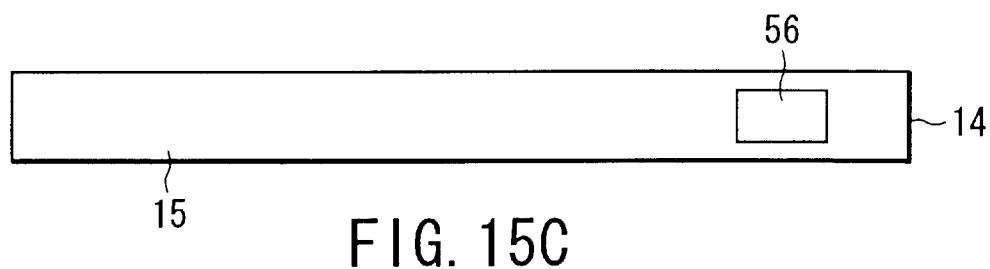

When the digital camera 14 is installed in the cradle 11 so as to arrange the imaging lens 16 toward the user side, as shown in FIGS. 15A and 15B, the control system infrared emitting and receiving portion 56 is opposed to the imaging system infrared emitting and receiving portion 54 so as to perform information transmission. When the digital camera 14 is installed in the cradle 11 so as to arrange the liquid crystal display portion 17 toward the user side, as shown in FIGS. 15A and 15C, the control system infrared emitting and receiving portion 56 is opposed to the display system infrared emitting and receiving portion 55 so as to perform information transmission.

In this way, by making the connection of the cradle 11 and the digital camera 14 as a non-contact system, even when the user frequently detaches and attaches the digital camera 14 on the cradle 11, it is possible to prevent a contact failure and the like due to wear of the terminals from developing.

Note that the present invention is not limited to the above described embodiment, but it can be modified variously and executed within a range not deviating from the spirit and the scope of the invention.

What is claimed is:

1. A cradle-installation type digital camera comprising:
   a camera body having a display portion, and
   an imaging lens on the camera body,
   wherein the camera body is constructed and arranged to be selectively installable in whichever states where the imaging lens is arranged toward the outside in a cradle or where the display portion is arranged toward the outside in the cradle, and
   wherein an imaging operation is performed on the basis of the control of the cradle in a state where the imaging lens is arranged toward the outside in the cradle.

2. A cradle-installation type digital camera according to claim 1, wherein the imaging operation is automatically performed at a predetermined interval on the basis of the control of the cradle.

3. A cradle-installation type digital camera comprising:
   a camera body having a display portion, and
   an imaging lens on the camera body,
   wherein the camera body is constructed and arranged to be selectively installable in whichever states where the imaging lens is arranged toward the outside in a cradle or where the display portion is arranged toward the outside in the cradle, and
   wherein an image display operation is performed on the display portion on the basis of the control of the cradle in a state where the display portion is arranged toward the outside in the cradle.

4. A cradle-installation type digital camera according to claim 3,
   wherein the image display operation is automatically displayed on the display portion with different images switched at a predetermined interval on the basis of the control of the cradle.

5. A cradle-installation type digital camera comprising:
   a camera body having a display portion, and
   an imaging lens on the camera body,
   wherein the camera body is constructed and arranged to be selectively installable in whichever states where the imaging lens is arranged toward the outside in a cradle or where the display portion is arranged toward the outside in the cradle, and
   wherein one power supply terminal serving as a positive polarity is provided and the one power supply terminal is common-connected to the same power supply terminal provided in the cradle in whichever states where the imaging lens is arranged toward the outside in the cradle or where the display portion is arranged toward the outside in the cradle.

6. A cradle-installation type digital camera according to claim 5, wherein there is provided a terminal which is connected to the one side of the terminal arranged so as to be symmetrical with the cradle by holding the power supply terminal in a state where the imaging lens is arranged toward the outside in the cradle and which is connected to the other side of the terminal so as to be symmetrical with the cradle by holding the power supply terminal in a state where the display portion is arranged toward the outside in the cradle.

7. A control method for a cradle-installation type digital camera to control the digital camera installed in a cradle, comprising:
   detecting whether the digital camera was installed in the cradle with the imaging lens arranged toward the outside, or the digital camera was installed in the cradle with the display portion arranged toward the outside; and
   controlling so as to allow the digital camera to perform an imaging operation in a state where it is detected that the digital camera was installed in the cradle with the imaging lens arranged toward the outside.

8. A control method for a cradle-installation type digital camera according to claim 7, wherein the imaging operation is automatically performed for the digital camera at a predetermined interval on the basis of the control of the cradle.

9. A control method for a cradle-installation type digital camera to control the digital camera installed in a cradle, comprising:

a detecting step of detecting whether the digital camera was installed in the cradle with an imaging lens arranged toward the outside, or the digital camera was installed in the cradle with a display portion arranged toward the outside; and a control step of controlling by the detecting step so as to allow the digital camera to perform an imaging operation in a state where it is detected that the digital camera was installed in the cradle with the imaging lens arranged toward the outside.

10. A control method for a cradle-installation type digital camera to control the digital camera installed in a cradle, comprising:

detecting whether the digital camera was installed in the cradle with an imaging lens arranged toward the outside, or the digital camera was installed in the cradle with a display portion arranged toward the outside; and controlling so as to allow the display portion to perform an image display operation in a state where it is detected that the digital camera was installed in the cradle with the display portion arranged toward the outside.

11. A control method for a cradle-installation type digital camera according to claim 10, wherein the image display operation is automatically displayed on the display portion with different images switched at a predetermined interval on the basis of the control of the cradle.

12. A control method for a cradle-installation type digital camera to control the digital camera installed in a cradle, comprising:

a detecting step of detecting whether the digital camera was installed in the cradle with an imaging lens arranged toward the outside, or the digital camera was installed in the cradle with a display portion arranged toward the outside; and a control step of controlling by the detecting step so as to allow the display portion to perform an imaging operation in a state where it is detected that the digital camera was installed in the cradle with the imaging lens arranged toward the outside.

13. A cradle-installation type digital camera system comprising:

a cradle;

a digital camera constituted to be selectively installable in whichever states where an imaging lens is arranged toward the outside in the cradle or a display portion is arranged toward the outside in the cradle; and a device capable of performing an operation linked to the digital camera which is connected to the cradle and installed in the cradle, wherein the device is a control device which controls so as to allow the digital camera to perform the imaging operation in a state where the digital camera is installed in the cradle with the imaging lens arranged toward the outside.

14. A cradle-installation type digital camera system comprising:

a cradle;

a digital camera constituted to be selectively installable in whichever states where an imaging lens is arranged toward the outside in the cradle or a display portion is arranged toward the outside in the cradle; and a device capable of performing an operation linked to the digital camera which is connected to the cradle and installed in the cradle, wherein the device is an image display device controlled so as to display the image taken from the imaging lens by the digital camera in a state where the digital camera is installed in the cradle with the imaging lens arranged toward the outside.

15. A cradle-installation type digital camera system comprising:

a cradle;

a digital camera constituted to be selectively installable in whichever states where an imaging lens is arranged toward the outside in the cradle or a display portion is arranged toward the outside in the cradle; and a device capable of performing an operation linked to the digital camera which is connected to the cradle and installed in the cradle, wherein the device is a control device to control so as to allow a recording medium mounted on the digital camera to perform reading and writing operation of information in a state where the digital camera is installed with the display portion arranged toward the outside.

16. A cradle-installation type digital camera system comprising:

a cradle;

a digital camera constituted to be selectively installable in whichever states where an imaging lens is arranged toward the outside in the cradle or a display portion is arranged toward the outside in the cradle; and a device capable of performing an operation linked to the digital camera which is connected to the cradle and installed in the cradle, wherein the device is an image display device in which image information that is output to the cradle is taken into the digital camera and is displayed on the display portion in a state where the digital camera is installed in the cradle with the display portion arranged toward the outside.

* * * * *